C. SANG.
TRANSMISSION MECHANISM.
APPLICATION FILED MAR. 17, 1920.
1,426,677.
Patented Aug. 22, 1922.
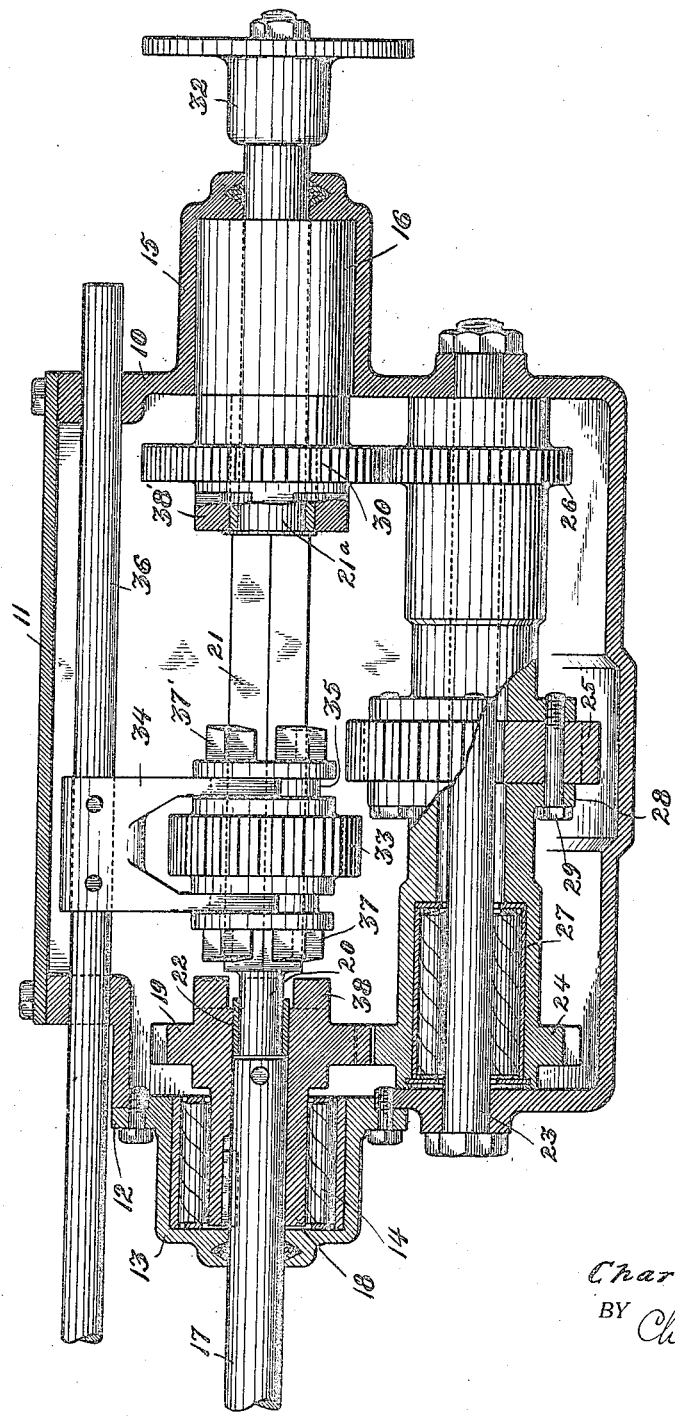
INVENTOR
Charlie Sang.
BY Chas E Townsend
ATTORNEY.

UNITED STATES PATENT OFFICE.

CHARLIE SANG, OF CASTORVILLE, CALIFORNIA.

TRANSMISSION MECHANISM.

1,426,677.  Specification of Letters Patent.  Patented Aug. 22, 1922.

Application filed March 17, 1920. Serial No. 366,677.

*To all whom it may concern:*

Be it known that I, CHARLIE SANG, a citizen of the United States, residing at Castorville, in the county of Monterey and State of California, have invented a new and useful Improvement in Transmission Mechanism, of which the following is a specification.

This invention relates to a power transmission means for motor vehicles.

It is the principal object of the present invention to provide a simple and directly acting transmission mechanism for motor vehicles whereby various speed changes may be easily made to produce a desired change in ratio between the driving and driven shafts of the transmission.

The present invention contemplates the use of main and auxiliary drive shafts, the auxiliary shaft carrying a set of gears, two of which are in constant mesh with gears upon the main shaft and a third gear adapted to be brought to mesh with a sliding gear on the main shaft.

The invention is illustrated by way of example in the accompanying drawing, in which:

The figure is an enlarged view in section and elevation showing the power transmission mechanism.

Referring more particularly to the drawings, 10 indicates a gear case having a cover plate 11 and a removable bearing plate 12. This plate 12 carries a bearing cup 13 within which anti-friction rollers 14 are housed. The gear case is further formed with a bearing cup 15 upon the opposite end of the case and in longitudinal alignment with the cup 13. The cup 15 carries anti-friction rollers 16. An engine shaft 17 extends in through the cup 13 and is keyed to the sleeve 18 of a driving gear 19. The sleeve or hub portion 18 of the gear 19 extends a considerable length along the shaft 17 and is rotatably supported by the anti-friction rollers 14. The end of shaft 17 terminates within the bore of the gear 19 and thus accommodates the spindle 20 of a squared shaft 21 which is free to rotate in relation to the gear and a bushing 22 carried within the gear. The shaft 21 is in longitudinal alignment with the shaft 17 and is rotatably supported at its opposite end by the anti-friction bearing 16.

Mounted parallel to the aligned shafts 17 and 21 is a jack shaft 23. This shaft carries gears 24, 25 and 26, all of which gears are free to rotate in relation to the shaft 23 as supported upon roller bearing 27. The gears 24 and 26 are formed with elongated hubs or sleeves provided at their adjacent ends with bolting flanges 28. These flanges rest upon the opposite sides of the gear 25 and are rigidly secured thereto by cap screws 29. Due to this construction all three of the gears 24, 25 and 26 will rotate in unison around the shaft 23 as driven in the manner hereinafter to be described.

The body portion of the shaft 21 is squared and is reduced to form a cylindrical extending portion $21^a$ which projects through a final drive gear 30 and the bearing 21 thereafter being fitted with any suitable coupling member 32. The squared portion of the shaft carries a sliding gear 33 which is adapted to be shifted by means of a yoke member 34. The yoke is formed with forks extending along the opposite sides of the gear and registering with grooves 35 in the hubs of this gear. The yoke member 34 is fixed to a shifting rod 36 which may be operated as desired. A jaw clutch 37 is formed on the end of the hub adjacent the gear 19 while a complementary jaw clutch 38 is formed on the end of the hub of gear 19 and adapted to be brought to mesh therewith.

In operation of the present invention the shaft 17 is directly connected with an engine clutch mechanism or if desired may be connected to the driving shaft of the usual speed changing transmission. In this case the device embodied in the present invention will be interposed between the usual transmission and the driving axle so that additional speeds may be obtained in combination with the original transmission. In any event a high driving speed would be obtained by bringing the jaw clutches 37 and 38 into mesh. This will connect the shaft 17 directly to the shaft 21 and will eliminate any gear reduction. Then the clutch members are disengaged and intermediate speed will be instantly produced due to the fact that gears 19 and 24 are in constant mesh as well as gears 26 and 30, thus by shifting the gear 33 so that its opposite end clutch face 37' may engage a similar face 38' on the hub of gear 30. The gear 30 will be locked to rotate the shaft 21 and power will be transmitted through the gear 19 to the gear 24 along the sleeve structure comprising gears 24 and 26 and then rotating the gears 26 and 30 with the resulting rotation of the shaft 21. In the event that an extreme high gear ratio is desired the gear 33 is moved into mesh with the gear 25 and due to the large diameter of the gear 25 in relation to the gear 33 a material reduction in the driving ratio will be brought about and the shaft 21 driven at its lowest speed. It will thus be seen that the present invention provides a simple and compact power transmission mechanism equipped with easily operating means whereby changes in the driving ratios in a driving and driven shaft may be readily brought about.

While I have shown the preferred form of my invention as now known to me, it will be understood that various changes in the construction, combination and arrangement of parts may be made by those skilled in the art without departing from the spirit of the invention as claimed.

Having thus described my invention, what I claim and desire to secure by Letters Patent, is:

A power transmission mechanism comprising a drive shaft, a gear keyed on the drive shaft having a clutch face thereon and also having an elongated journal bearing formed therein, in which the drive shaft has substantial mounting, a driven shaft having a short reduced end journaled within said gear, with its inner end lying adjacent the inner end of the drive shaft, a gear freely mounted on the driven shaft and having a clutch face on one end thereof, a sliding gear splined to the driven shaft and having clutch faces on opposite ends thereof, a shifting rod slidably mounted above the driven shaft, a yoke secured to said shifting rod and engaging the sliding gear for shifting the latter in opposite extreme and intermediate positions when the shifting rod is actuated, an auxiliary shaft, sleeves rotatably mounted on the auxiliary shaft, a gear formed at the outer end of the sleeves, one in constant mesh with said fixed gear on the drive shaft and the other in constant mesh with the free gear on the driven shaft, and an intermediate gear on the auxiliary shaft, said sleeves each having a flange at its inner end bolted to said intermediate gear, said intermediate gear being arranged for meshing engagement with said sliding gear.

CHARLIE SANG.

Witnesses:
  SAM AHTYE,
  JAMES M. ABBETT.